(12) United States Patent
Casser et al.

(10) Patent No.: US 12,499,673 B2
(45) Date of Patent: Dec. 16, 2025

(54) LARGE SCENE NEURAL VIEW SYNTHESIS

(71) Applicant: Waymo LLC, Mountain View, CA (US)

(72) Inventors: Vincent Michael Casser, Cambridge, MA (US); Henrik Kretzschmar, Mountain View, CA (US); Matthew Justin Tancik, Albuquerque, NM (US); Sabeek Mani Pradhan, San Francisco, CA (US); Benjamin Joseph Mildenhall, London (GB); Pratul Preeti Srinivasan, San Francisco, CA (US); Jonathan Tilton Barron, Alameda, CA (US)

(73) Assignee: Waymo LLC, Mountain View, CA (US)

( * ) Notice: Subject to any disclaimer, the term of this patent is extended or adjusted under 35 U.S.C. 154(b) by 461 days.

(21) Appl. No.: 18/074,371

(22) Filed: Dec. 2, 2022

(65) Prior Publication Data

US 2023/0177822 A1    Jun. 8, 2023

Related U.S. Application Data

(60) Provisional application No. 63/285,980, filed on Dec. 3, 2021.

(51) Int. Cl.
*G06V 10/82* (2022.01)
*G06T 5/50* (2006.01)
*G06V 10/74* (2022.01)

(52) U.S. Cl.
CPC ............. *G06V 10/82* (2022.01); *G06T 5/50* (2013.01); *G06V 10/761* (2022.01); *G06T 2207/10024* (2013.01); *G06T 2207/20221* (2013.01)

(58) Field of Classification Search
CPC ........ G06V 10/82; G06V 10/761; G06T 5/50; G06T 2207/10024; G06T 2207/20221; G06T 15/503; G06T 15/20; G06T 17/00; G06T 7/73; G06T 7/85; G06T 15/005; G06T 2207/20081; G06T 2207/20084; G06N 3/08
See application file for complete search history.

(56) References Cited

U.S. PATENT DOCUMENTS

| | | | |
|---|---|---|---|
| 11,734,792 B2 * | 8/2023 | Yun ................ | G06T 15/205 |
| | | | 382/100 |
| 12,131,422 B2 * | 10/2024 | Zhuang ............. | G06N 3/045 |
| 2019/0258907 A1 | 8/2019 | Rezende et al. | |

(Continued)

FOREIGN PATENT DOCUMENTS

| | | |
|---|---|---|
| CN | 110168560 A | 8/2019 |
| CN | 113014906 A | 6/2021 |

OTHER PUBLICATIONS

Agarwal et al., "Building rome in a day," Communications of the ACM, Oct. 2011, pp. 105-112.

(Continued)

*Primary Examiner* — Tom Y Lu
(74) *Attorney, Agent, or Firm* — Fish & Richardson P.C.

(57) ABSTRACT

Methods, systems, and apparatus, including computer programs encoded on a computer storage medium, for rendering a new image that depicts a scene from a perspective of a camera at a new camera viewpoint.

20 Claims, 4 Drawing Sheets

(56) References Cited

U.S. PATENT DOCUMENTS

2019/0320164 A1* 10/2019 Salahieh .............. H04N 13/156
2023/0154104 A1*  5/2023 Zhuang ................ G06V 10/774
                                                       345/427

OTHER PUBLICATIONS

Amini et al., "Learning robust control policies for end-to-end autonomous driving from data-driven simulation," IEEE Robotics and Automation Letters, Apr. 2020, 5(2):1143-1150.
Barron et al., "Mip-NeRF: A Multiscale Representation for Anti-Aliasing Neural Radiance Fields," CoRR, Mar. 24, 2021, arxiv.org/abs/2103.13415, 19 pages.
bmild.github.io/fourfeat/index.html [online], "Fourier Features Let Networks Learn High Frequency Functions in Low Dimensional Domains," Jan. 24, 2021, retrieved on Jun. 2, 2023, retrieved from URL<https://bmild.github.io/fourfeat/index.html/>, 5 pages.
Bojanowski et al., "Optimizing the latent space of generative networks," CoRR, Jul. 18, 2017, arXiv:1707.05776, 10 pages.
Brualla et al., "NeRF in the Wild: Neural Radiance Fields for Unconstrained Photo Collections," CoRR, Aug. 5, 2020, arxiv.org/abs/2008.02268, 15 pages.
Buehler et al., "Unstructured lumigraph rendering," Computer graphics and interactive techniques, Aug. 2001, pp. 425-432.
Caesar et al., "nuScenes: A multimodal dataset for autonomous driving," Proceedings of the IEEE/CVF Conference on Computer Vision and Pattern Recognition (CVPR), 2020, pp. 11621-11631.
Chang et al., Argoverse: 3D tracking and forecasting with rich maps, Proceedings of the IEEE/CVF Conference on Computer Vision and Pattern Recognition (CVPR), 2019, pp. 8748-8757.
Chen et al., "Geosim: Realistic video simulation via geometry-aware composition for self-driving," Proceedings of the IEEE/CVF Conference on Computer Vision and Pattern Recognition (CVPR), 2021, pp. 7230-7240.
Cheng et al., "Panoptic-deeplab: A simple, strong, and fast baseline for bottom-up panoptic segmentation," Proceedings of the IEEE/CVF Conference on Computer Vision and Pattern Recognition (CVPR), 2020, pp. 12475-12485.
Cordts et al., "The cityscapes dataset for semantic urban scene understanding," Proceedings of the IEEE Conference on Computer Vision and Pattern Recognition (CVPR), 2016, pp. 3213-3223.
Deng et al., "Depth-supervised NeRF: Fewer Views and Faster Training for Free," CoRR, Jul. 6, 2021, arxiv.org/abs/2107.02791, 13 pages.
Devaranjan et al., "Meta-sim2: Unsupervised learning of scene structure for synthetic data generation," Computer Vision ECCV, 2020, 26 pages.
Dosovitskiy et al., "Carla: An open urban driving simulator," Proceedings of the 1st Annual Conference on Robot Learning, 2017, 78:1-16.
Du et al., "The unmanned aerial vehicle benchmark: Object detection and tracking," Proceedings of the European Conference on Computer Vision, 2018, pp. 370-386.
Extended European Search Report in European Appln. No. 22211253.4, dated May 9, 2023, 9 pages.
Flynn et al., "Deepstereo: Learning to predict new views from the world's imagery," Proceedings of the IEEE Conference on Computer Vision and Pattern Recognition (CVPR), 2016, pp. 5515-5524.
Fruh et al., "An automated method for large-scale, ground-based city model acquisition," IJCV, Oct. 2004, 60:5-24.
Furukawa et al., "Accurate, dense, and robust multi-view stereopsis," IEEE Transactions on Pattern Analysis and Machine Intelligence, Aug. 2010, 32(8):1362-1376.
Furukawa et al., "Towards internet-scale multi-view stereo," 2010 IEEE Computer Society Conference on Computer Vision and Pattern Recognition, Jun. 13-18, 2010, 8 pages.
Gaidon et al., "Virtual worlds as proxy for multi-object tracking analysis," Proceedings of the IEEE Conference on Computer Vision and Pattern Recognition (CVPR), 2016, pp. 4340-4349.
Garbin et al., "Fastnerf: High-fidelity neural rendering at 200FPS," Proceedings of the IEEE/CVF International Conference on Computer Vision (ICCV), 2021, pp. 14346-14355.
Geiger et al., "Are we ready for autonomous driving? the kitti vision benchmark suite," 2012 IEEE Conference on Computer Vision and Pattern Recognition, 8 pages.
Haklay et al., "Openstreetmap: Usergenerated street maps," IEEE Pervasive Computing, Oct.-Dec. 2008, 7(4):12-18.
Hedman et al., "Baking neural radiance fields for real-time view synthesis," CoRR, Mar. 26, 2021, arxiv.org/abs/2103.14645, 15 pages.
Hedman et al., "Deep blending for free-viewpoint image-based rendering," ACM Transactions on Graphics, Dec. 4, 2018, 37(6):1-15.
Kar et al., "Meta-sim: Learning to generate synthetic datasets," Proceedings of the IEEE/CVF International Conference on Computer Vision (ICCV), 2019, pp. 4551-4560.
Kazhdan et al., "Screened poisson surface reconstruction," ACM Transactions on Graphics, Jul. 4, 2013, 32(3):1-13.
Kim et al., "Drivegan: Towards a controllable high-quality neural simulation," Proceedings of the IEEE/CVF Conference on Computer Vision and Pattern Recognition (CVPR), 2021, pp. 5820-5829.
Kingma et al., "Adam: A method for stochastic optimization," CoRR, Dec. 22, 2014, arxiv.org/abs/1412.6980, 15 pages.
Kopf et al., "First-person hyper-lapse videos," ACM Transactions on Graphics, Jul. 27, 2014, 33(4):1-10.
Kopf et al., "Street slide: browsing street level imagery," ACM Transactions on Graphics, Jul. 26, 2010, 4(96):1-8.
Li et al., "AADS: Augmented autonomous driving simulation using data-driven algorithms," Science Robotics, Mar. 27, 2019, 4(28):eaaw0863.
Li et al., "Modeling and recognition of landmark image collections using iconic scene graphs," European Conference on Computer Vision, 2008, pp. 427-440.
Lin et al., "BARF: Bundle-Adjusting Neural Radiance Fields," CoRR, Apr. 13, 2021, arxiv.org/abs/2104.06405, 15 pages.
Liu et al., "Infinite nature: Perpetual view generation of natural scenes from a single image," Proceedings of the IEEE/CVF International Conference on Computer Vision (ICCV), 2021, pp. 14458-14467.
Liu et al., "Neural Sparse Voxel Fields," CoRR, Jan. 6, 2021, arXiv:2007.11571v2, 22 pages.
Lombardi et al., "Neural volumes: Learning dynamic renderable volumes from images," CoRR, Jun. 18, 2019, arxiv.org/abs/1906.07751, 14 pages.
Lowe, "Distinctive image features from scaleinvariant keypoints," IJCV, Nov. 2004, 60:91-110.
Martin-Brualla et al., "Nerf in the wild: Neural radiance fields for unconstrained photo collections," Proceedings of the IEEE/CVF Conference on Computer Vision and Pattern Recognition (CVPR), 2021, pp. 7210-7219.
matthewtancik.com [online], "Representing Scenes as Neural Radiance Fields for View Synthesis," Mar. 20, 2020, retrieved on Jun. 2, 2023, retrieved from URL<https://www.matthewtancik.com/nerf/>, 10 pages.
Meng et al., "GNeRF: GAN-based Neural Radiance Field without Posed Camera," CoRR, Mar. 29, 2021, arxiv.org/abs/2103.15606, 12 pages.
Meshry et al., "Neural rerendering in the wild," Proceedings of the IEEE/CVF Conference on Computer Vision and Pattern Recognition (CVPR), 2019, pp. 6878-6887.
Mildenhall et al., "NeRF: representing scenes as neural radiance fields for view synthesis," Communications of the ACM, Aug. 3, 2020, 65(1):99-106.
Multiple View Geometry in Computer Vision, Cambridge University Press, Second Edition, 2003, Chapter 2, 48 pages.
Neff et al., "DONeRF: Towards Real-Time Rendering of Compact Neural Radiance Fields using Depth Oracle Networks," CoRR, Mar. 4, 2021, arxiv.org/abs/2103.03231, 15 pages.

(56) References Cited

OTHER PUBLICATIONS

Ost et al., "Neural scene graphs for dynamic scenes," Proceedings of the IEEE/CVF Conference on Computer Vision and Pattern Recognition (CVPR), 2021, pp. 2856-2865.
Park et al., "Nerfies: Deformable neural radiance fields," Proceedings of the IEEE/CVF International Conference on Computer Vision (ICCV), 2021, pp. 5865-5874.
Pollefeys et al., "Detailed real-time urban 3D reconstruction from video," IJCV; Oct. 20, 2007, 25 pages.
Pulli et al., "View-based rendering: visualizing real objects from scanned rance and color data," Rendering Techniques, Proceedings of the eurographics workshop, Jun. 16, 1997, 8:23-34.
Rebain et al., "DeRF: Decomposed radiance fields," Proceedings of the IEEE/CVF Conference on Computer Vision and Pattern Recognition (CVPR), 2021, pp. 14153-14161.
Reiser et al., "KiloNeRF: Speeding up neural radiance fields with thousands of tiny MLPs," Proceedings of the IEEE/CVF International Conference on Computer Vision (ICCV), 2021, pp. 14335-14345.
Richter et al., "Enhancing photorealism enhancement," CoRR, May 10, 2021, arXiv:2105.04619, 16 pages.
Richter et al., "Playing for data: Ground truth from computer games," ECCV, Sep. 17, 2016, 16 pages.
Riegler et al., "Free view synthesis," ECCV, Nov. 13, 2020, 17 pages.
Riegler et al., "Stable view synthesis," Proceedings of the IEEE/CVF Conference on Computer Vision and Pattern Recognition (CVPR), 2021, pp. 12216-12225.
Ros et al., "The synthia dataset: A large collection of synthetic images for semantic segmentation of urban scenes," Proceedings of the IEEE Conference on Computer Vision and Pattern Recognition (CVPR), 2016, pp. 3234-3243.
Schonberger et al., "Structure-from-motion revisited," roceedings of the IEEE Conference on Computer Vision and Pattern Recognition (CVPR), 2016, pp. 4104-4113.
Shan et al., "The visual turing test for scene reconstruction," 2013 International Conference on 3D Vision—3DV 2013, Jun. 29, 2013, pp. 25-32.
Snavely et al., "Photo tourism: Exploring photo collections in 3d," Siggraph '06: ACM Siggraph 2006 Papers, Jul. 2006, pp. 835-846.
Sun et al., "Scalability in perception for autonomous driving: Waymo open dataset," Proceedings of the IEEE/CVF Conference on Computer Vision and Pattern Recognition (CVPR), 2020, pp. 2446-2454.
Takikawa et al., "Neural geometric level of detail: Real-time rendering with implicit 3D shapes," Proceedings of the IEEE/CVF Conference on Computer Vision and Pattern Recognition (CVPR), 2021, pp. 11358-11367.
Tancik et al., "Fourier Features Let Networks Learn High Frequency Functions in Low Dimensional Domains," CoRR, Jun. 16, 2020, arxiv.org/abs/2006.10739, 24 pages.
Thrun, "Probabilistic robotics," Communications of the ACM, 2002, 45(3):52-57.
Triggs et al., "Bundle adjustment—a modern synthesis. International workshop on vision algorithms," Lecture Notes in Computer Science, 2000, 1883:298-372.
Wang et al., "NeRF—: Neural Radiance Fields Without Known Camera Parameters," CoRR, Feb. 14, 2021, arxiv.org/abs/2102.07064, 17 pages.
Yang et al., "Learning object-compositional neural radiance field for editable scene rendering," Proceedings of the IEEE/CVF International Conference on Computer Vision (ICCV), 2021, pp. 13779-13788.
Yang et al., "Surfelgan: Synthesizing realistic sensor data for autonomous driving," Proceedings of the IEEE/CVF Conference on Computer Vision and Pattern Recognition (CVPR), 2020, pp. 11118-11127.
Yu et al., "Plenoctrees for real-time rendering of neural radiance fields," CoRR, Mar. 25, 2021, arXiv:2103.14024, 18 pages.
Zhang et al., "Editable free-viewpoint video using a layered neural representation," ACM Transactions on Graphics, Jul. 19, 2021, 40(4):1-18.
Zhang et al., "The unreasonable effectiveness of deep features as a perceptual metric," Proceedings of the IEEE Conference on Computer Vision and Pattern Recognition (CVPR), 2018, pp. 586-595.
Zhou et al., "Stereo magnification: Learning view synthesis using multiplane images," CoRR, May 24, 2018, arXiv:1805.09817, 12 pages.
Zhu et al., "Very large-scale global SFM by distributed motion averaging," Proceedings of the IEEE Conference on Computer Vision and Pattern Recognition (CVPR), 2018, pp. 4568-4577.
Office Action in Chinese Appln. No. 202211552177.3, mailed on Jun. 23, 2025, 17 pages (with English translation).

* cited by examiner

LARGE SCENE NEURAL VIEW SYNTHESIS

CROSS-REFERENCE TO RELATED APPLICATION

This application claims the benefit of the filing date of U.S. Provisional Patent Application No. 63/285,980, which was filed on Dec. 3, 2021, and which is incorporated here by reference in its entirety.

BACKGROUND

This specification relates to synthesizing images using neural networks.

Neural networks are machine learning models that employ one or more layers of learned operations to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

SUMMARY

This specification describes a system implemented as computer programs on one or more computers in one or more locations that synthesizes images of a scene in an environment.

Throughout this specification, a "scene" can refer to, e.g., a real world environment, or a simulated environment (e.g., a simulation of a real-world environment, e.g., such that the simulated environment is a synthetic representation of a real-world scene).

An "embedding" of an entity can refer to a representation of the entity as an ordered collection of numerical values, e.g., a vector, matrix, or other tensor of numerical values.

The subject matter described in this specification can be implemented in particular embodiments so as to realize one or more of the following advantages.

Some existing neural image rendering techniques can perform photo-realistic reconstruction and novel view synthesis given a set of camera images of a scene. However, these existing techniques are generally only applicable for small-scale or object-centric reconstruction, e.g., at most the size of a single room or building. Applying these techniques to large environments typically leads to significant artifacts and low visual fidelity due to limited model capacity.

However, reconstructing large-scale environments enables several important use-cases in domains such as autonomous driving and aerial surveying. One example is mapping, where a high-fidelity map of the entire operating domain is created to act as a powerful prior for a variety of problems, including robot localization, navigation, and collision avoidance. Furthermore, large-scale scene reconstructions can be used for closed-loop robotic simulations, and/or to generate synthetic training data for perception algorithms.

Autonomous driving systems are commonly evaluated by re-simulating previously encountered scenarios; however, any deviation from the recorded encounter may change the vehicle's trajectory, requiring high-fidelity novel view renderings along the altered path. Beyond basic view synthesis, robustness of these tasks can be increased if the view synthesis models are also capable of changing environmental lighting conditions such as camera exposure, weather, or time of day, which can be used to further augment simulation scenarios.

Reconstructing such large-scale environments introduces additional challenges, including the presence of transient objects (cars and pedestrians), limitations in model capacity, along with memory and compute constraints. Furthermore, training data for such large environments is highly unlikely to be collected in a single capture under consistent conditions. Rather, data for different parts of the environment may need to be sourced from different data collection efforts, introducing variance in both scene geometry (e.g., construction work and parked cars), as well as appearance (e.g., weather conditions and time of day).

The described techniques account for these challenges to generate accurate reconstructions and synthesize novel views in large scale environments, e.g., of large-scale scenes like those encountered in urban driving scenarios.

In particular, the described techniques divide up large environments into individually trained view synthesis models, each of which corresponds to a sub-region of a given scene. These view synthesis models are then rendered and combined dynamically at inference time. Modeling these models independently allows for maximum flexibility, scales up to arbitrarily large environments and provides the ability to update or introduce new regions in a piecewise manner without retraining the entire environment. To compute a target camera viewpoint, only a subset of the view synthesis models are rendered and then composited based on their geographic location compared to the camera for the target view. Thus, the image synthesis process for any given view remains computationally efficient despite being able to handle any viewpoint within a large scene.

In some implementations, the techniques incorporate appearance embeddings to address the environmental changes between training images as described above.

In some implementations, the techniques incorporate learned pose refinement to account for pose errors in the training data for the view synthesis models.

In some implementations, the techniques incorporate exposure conditioning to provide the ability to modify the exposure during inference, i.e., to provide synthetic images that appear as if they were taken by a camera with a specified exposure level.

In some implementations, to allow for more seamless compositing of multiple synthesized images from multiple different models, the techniques incorporate an appearance matching technique which brings different models into visual alignment by optimizing their appearance embeddings.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
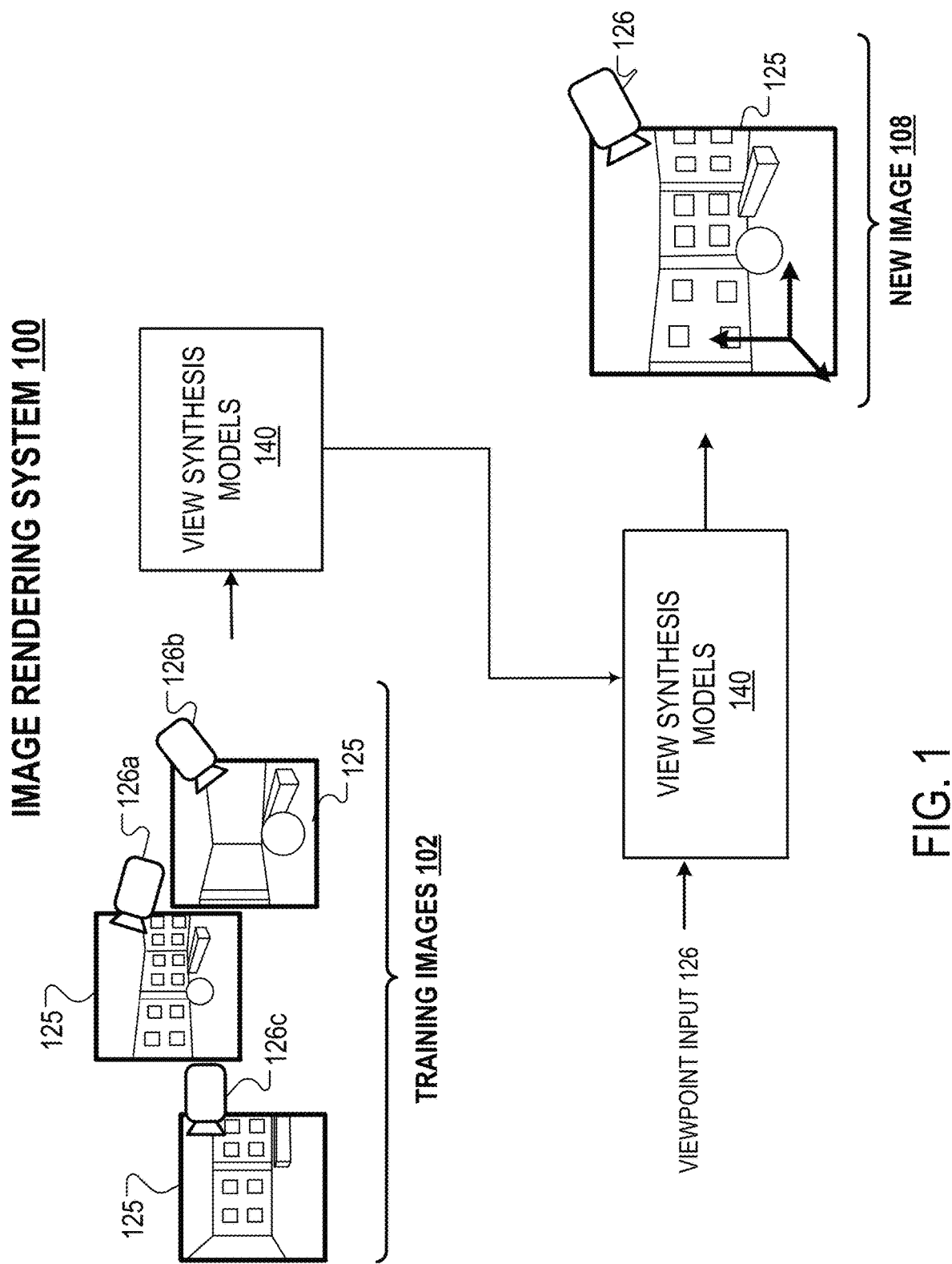
FIG. 1 is a block diagram of an example image rendering system.

FIG. 1 is a block diagram of an example image rendering system 100 that can render ("synthesize") a new image 108 that depicts a scene 125 from a perspective of a camera at a new camera viewpoint 126. The image rendering system 100 is an example of a system implemented as computer programs on one or more computers in one or more locations in which the systems, components, and techniques described below are implemented.

An "image" can generally be represented, e.g., as an array of "pixels," where each pixel is associated with a respective point in the image (i.e., with a respective point in the image plane of the camera) and corresponds to a respective vector of one or more numerical values representing image data at the point. For example, a two-dimensional (2D) RGB image can be represented by a 2D array of pixels, where each pixel is associated with a respective three-dimensional (3D) vector of values representing the intensity of red, green, and blue color at the point corresponding to the pixel in the image.

Throughout this specification, a "scene" can refer to, e.g., a real world environment, or a simulated environment. For example, as illustrated in FIG. 1, the scene 125 can include various geometric objects in a simulated environment.

Generally, by making use of improved view synthesis techniques, the system 100 can accurately render new images of large-scale scenes. For example, the system 100 can render new images of an urban driving scene that spans multiple city blocks, e.g., an entire multi-block neighborhood in a dense, urban city.

A camera "viewpoint" can refer to, e.g., a location and/or an orientation of the camera within the scene 125. A location of a camera can be represented, e.g., as a three-dimensional vector indicating the spatial position of the camera within the scene 125. The orientation of the camera can be represented as, e.g., a three-dimensional vector defining a direction in which the camera is oriented, e.g., the yaw, pitch, and roll of the camera.

For example, the system 100 can synthesize new images as part of generating a computer simulation of a real-world environment being navigated through by a simulated autonomous vehicle and other agents. For example, the synthesized images can ensure the simulation includes images that are similar to those encountered in the real-world environment but capture novel views of the scene that aren't available in images of the real-world environment. More generally, the simulation can be part of testing the control software of a real-world autonomous vehicle before the software is deployed on-board the autonomous vehicle, of training one or more machine learning models that will later be deployed on-board the autonomous vehicle, or both. As a particular example, the synthesized new images can be used to construct a high-fidelity map of the entire operating domain to act as a prior for testing software for a variety of problems, including robot localization, navigation, and collision avoidance.

As another example, the synthesized images can be used to augment a training data set that is used to train one or more machine learning models that will later be deployed on-board the autonomous vehicle. That is, the system can generate synthesized images from novel viewpoints and use the synthesized images to improve the robustness of a training data set that is used to train one or more machine learning models, e.g., a computer vision model. Examples of computer vision models include image classification models, object detection models, and so on.

As yet another example, the synthesized images can be generated and displayed to users in a user interface to allow users to view environments from different perspective locations and camera viewpoints. In one example, the image rendering system 100 can be used as part of a software application (e.g., referred to for convenience as a "street view" application) that provides users with access to interactive panoramas showing physical environments, e.g., environments in the vicinity of streets. In response to a user request to view a physical environment from a perspective of a camera at a new camera viewpoint, the street view application can provide the user with a rendered image of the environment generated by the image rendering system 100. As will be described below, the image rendering system can render the new image of the environment based on a collection of existing images of the environment, e.g., that were previously captured by a camera mounted on a vehicle that traversed the environment.

In another example, the image rendering system 100 can be used to render images of a virtual reality environment, e.g., implemented in a virtual reality headset or helmet. For example, in response to receiving a request from a user to view the virtual reality environment from a different perspective, the image rendering system can render a new image of the virtual reality environment from the desired perspective and provide it to the user.

The image rendering system 100 can render the new image 108 of the scene 125 using a plurality of view synthesis models 140.

Each view synthesis model 140 corresponds to a respective sub-region of the scene 125 in the environment and is configured to receive an input specifying a camera viewpoint in the corresponding sub-region and to generate as output a synthesized image of the scene from the camera viewpoint. Generally, each view synthesis model 140 includes the same neural networks with the same architecture, but the neural networks have different parameters due to the training of the models.

More specifically, each view synthesis model 140 has been trained, i.e., by the system 100 or a different training system, on a different subset of a set of training images 102. In particular, each view synthesis model 140 has been trained on training images from the set of training images 120 that are taken from camera viewpoints that are within the corresponding sub-region. Because each view synthesis model 140 corresponds to a different, possibly overlapping sub-region, the training system can train the models 140 independently and can modify which models are in the plurality of models 140 by adding or removing new models 140 without re-training any of the other models in the maintained plurality.

Example techniques for training a view synthesis model 140 are described below with reference to FIG. 3.

At a high level, once the models 140 are trained, the system 100 can generate the new image 108 by selecting, based on the new camera viewpoint 126, a subset of the plurality of view synthesis models 140.

The system 100 then processes a respective input specifying the new camera viewpoint 126 using each model 140 that is in the subset to generate as output a synthesized image of the scene from the new camera viewpoint 126. Thus, the system 100 generates a respective synthesized image for each model 140 that is in the subset.

The system 100 then combines the synthesized images generated by the view synthesis models 140 in the subset to generate a final synthesized image of the scene from the new camera viewpoint 126.

Figure 2:
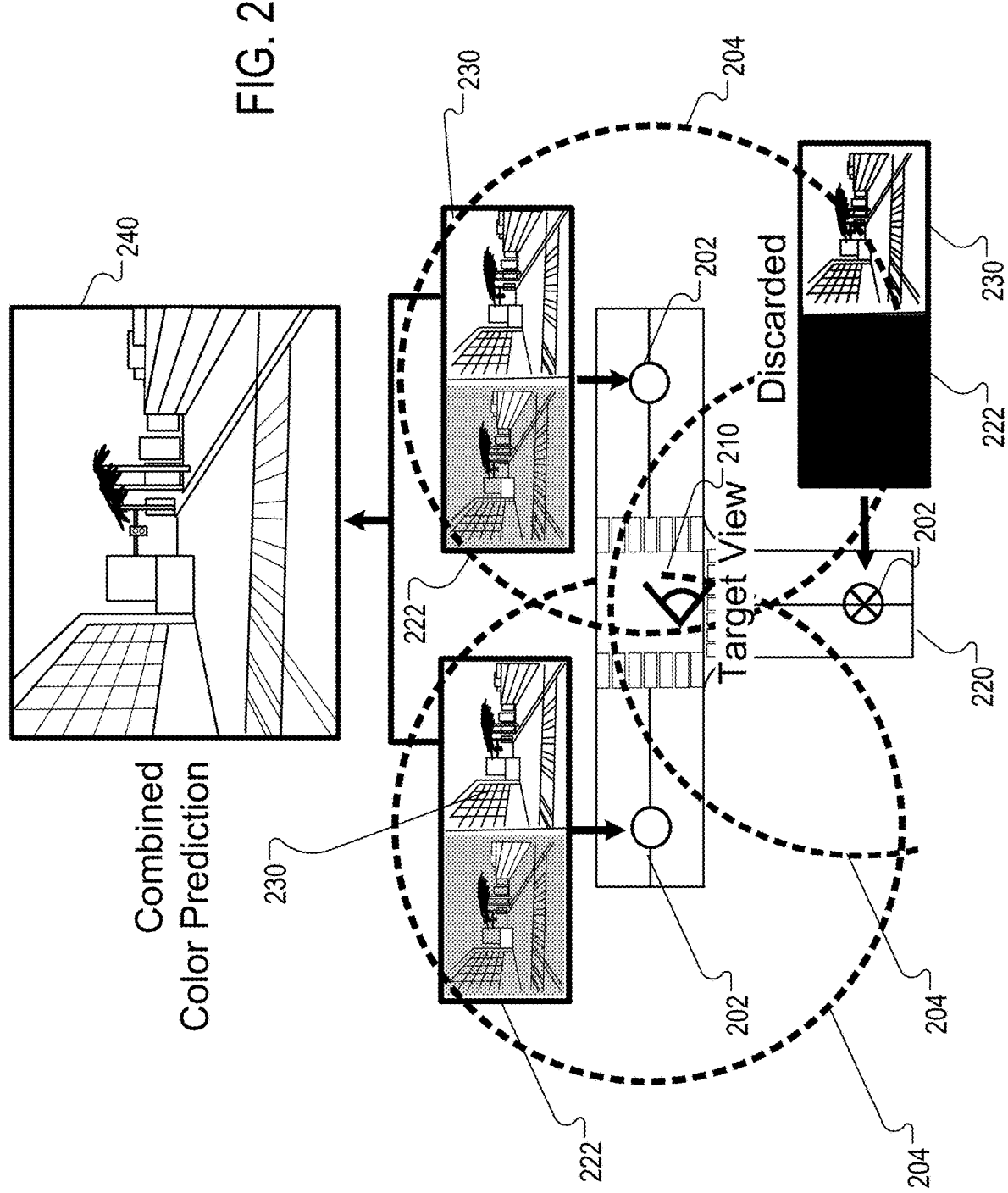
FIG. 2 illustrates an example of the rendering of an image of a scene.

An example of generating a new image is shown in FIG. 2.

FIG. 2 shows an example of the operation of the system 100.

In the example of FIG. 2, the system 100 maintains three models 140. Each model 140 has a corresponding sub-region that is defined by a respective origin location 202 and a radius 204, i.e., so that the sub-region for each model 140 includes all of the points that are within the corresponding radius 204 of the original location 202.

More generally, the system 100 can divide a scene into sub-regions in any appropriate way, given that each point in the scene is in the sub-region for at least one of the models 140.

For example, for urban driving scenarios, the system 100 can place one model 140 at each intersection, with a sub-region that covers the intersection itself and any connected street 75% of the way until it converges into the next intersection. This results in a 50% overlap between any two adjacent blocks on the connecting street segment, which, as will be described below, can make appearance alignment easier. Following this procedure means that the block size is variable; where necessary, additional blocks may be introduced as connectors between intersections.

As another example, i.e., in the example shown in FIG. 2, the system 100 instead places models 140 along a single street segment at uniform distances and defines each sub-region size as a sphere around a corresponding origin 202.

In the example shown in FIG. 2, the system receives a new camera viewpoint 210.

As shown in FIG. 2, the new camera viewpoint 210 specifies both a location and an orientation ("pose") of a camera in the scene.

As can be seen from FIG. 2, the new camera viewpoint 210 is within the corresponding sub-region for each of the three models 140. Thus, the system 100 initially selects all three models 140 to be in the subset. However, in the example of FIG. 2, one of the models 140 is discarded 220 by the system 100 from the subset based on respective visibility estimates 222 generated by the system 100 for each of the models 140. Generally, the visibility estimate for a given model estimates a degree to which points along rays cast from the new viewpoint were visible in training images used to train the view synthesis model 140. In the example of FIG. 2, the visibility estimate 222 includes a respective visibility score that ranges from zero to one for each pixel in an image taken from the target viewpoint 210. Because the discarded model 220 has a low visibility estimate (as evidenced by the visibility 222 for the discarded model 220 being all black, i.e., all zeros, in FIG. 2), the system 100 discards the model 220 from the subset.

Generating visibility estimates and determining whether to discard models 140 is described in more detail below with reference to FIGS. 3 and 4.

For each of the two models 140 that were not discarded, the system 100 then generates a respective image 230 of the scene from the new viewpoint. While FIG. 2 also shows an image 230 being generated by the discarded model 220, this is not necessary and can be omitted in order to increase the computational efficiency of the view synthesis process. As can be seen from FIG. 2, the image 230 generated by the discarded model 220 is blurry and may not add any valuable information to the images generated by the other models 140.

One example technique for generating an image of a scene from a new viewpoint using a view synthesis model is described below with reference to FIG. 3.

The system 100 then combines the two new images 230 to generate a final image 240 of the scene from the new viewpoint.

Combining images from multiple models 140 is described in more detail below with reference to FIG. 4.

Thus, the system 100 can accurately generate new images of the scene from any given viewpoint by combining different images of the scene generated by the different ones of the models 140.

Figure 3:
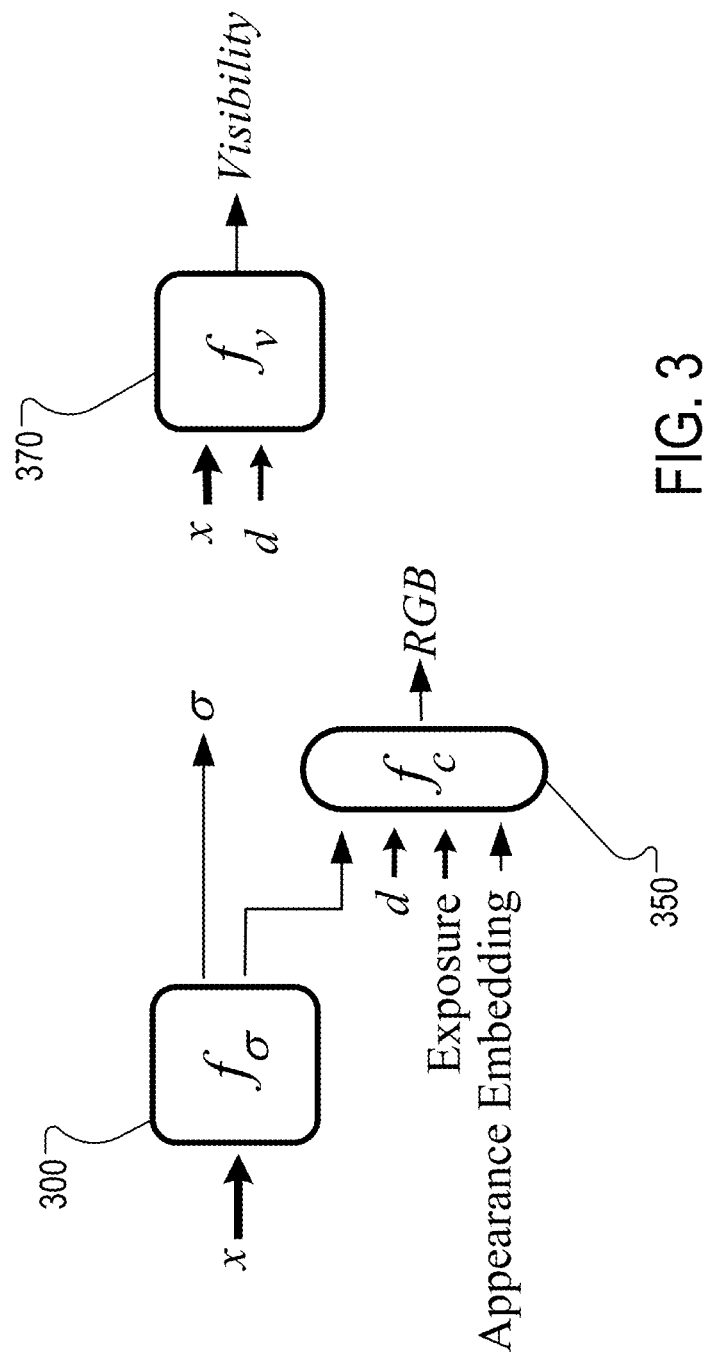
FIG. 3 shows an example view synthesis model.

FIG. 3 shows an example of the operation of one of the view synthesis models 140. As described above, each model 140 will generally have the same architecture and will generate synthetic images in the same manner. However, because each model 140 corresponds to a different sub-region of the scene and is trained on images associated with the corresponding sub-region, each model 140 will generally have different parameters after training and therefore different models 140 will generate different images given the same camera viewpoint.

As shown in FIG. 3, the model 140 includes a first neural network 300 and a second neural network 350.

The first neural network 300 ($f_\sigma$) is configured to receive a first input that includes data representing coordinates of a point x in the scene and to process the first input to generate an output that includes (i) a volume density σ for the point x and (ii) a feature vector. For example, the first neural network 300 can be a multi-layer perceptron (MLP) that processes the coordinates x to generate the output.

As a particular example, the point in the scene can be represented as, e.g., a three-dimensional vector of spatial coordinates x.

Generally, the volume density at a point in the scene can characterize any appropriate aspect of the scene at the point. In one example, the volume density at a point in the scene can characterize a likelihood that a ray of light traveling through the scene would terminate at the point x in the scene.

In particular, the model 140 can be configured such that the volume density σ is generated independently from the viewing direction d, and thus varies only as a function of points in the scene. This can encourage volumetric consistency across different viewing perspectives of the same scene.

In some cases, the volume density can have values, e.g., σ≥0, where the value of zero can represent, e.g., a negligible likelihood that a ray of light would terminate at a particular point, e.g., possibly indicating that there are no objects in the scene at that point. On the other hand, a large positive value of volume density can possibly indicate that there is an object in the scene at that point and therefore there is a high likelihood that a ray would terminate at that location.

The second neural network 350 ($f_c$) is configured to receive an input that includes the feature vector (generated by the neural network 300) and data representing a viewing direction d and process the second input to generate as output a color. For example, the second neural network 350 can also be an MLP that processes the feature vector d to generate as output the color.

The color generated as output by the second neural network 350 for a given viewing direction d and point x is the radiance emitted in that viewing direction at that point in the scene, e.g., RGB, where R is the emitted red color, G is the emitted green color, and B is the emitted blue color.

Optionally, the "second" input to the second neural network 350 can also include additional information.

As one example, the input can also include an appearance embedding characterizing a target appearance of the synthesized image. Including the appearance embedding can allow the model 140 to account for appearance changing factors, i.e., factors that can cause two images taken from the same point and same viewing direction to have a different appearance. Two examples of these factors are varying weather conditions and varying lighting conditions, e.g., time of day. In particular, during training, the training system can be trained to incorporate the appearance embeddings by using Generative Latent Optimization to optimize a respective per-image appearance embedding for each training image. After training, the system 100 can use these appearance embeddings to interpolate between different appearance changing factors observed during training.

As another example, the second input can include target camera exposure information for the synthesized image. That is, training images for the model 140 may be captured across a wide range of exposure levels, which can impact the training if left unaccounted for. By including the camera exposure information during training, the model 140 can compensate for the visual differences caused by different exposure levels. Thus, after training, the model 140 can generate an image that appears as if it was taken by a camera that has a target exposure level by including the target exposure level as part of the second input. As one example, the exposure information can be represented as $\gamma_{PE}$(shutter speed x analog gain/t), where $\gamma_{PE}$ is a sinusoidal positional encoding with a fixed number of levels, e.g., 2, 4, or 6, and t is a scaling factor, e.g., equal to 250, 700, 1000, or 1500.

In some implementations, the model 140 can also represent the inputs x and d using the sinusoidal positional encoding $\gamma_{PE}$.

Generally, $\gamma_{PE}$ can represent each component z of a given input as a vector:

$$\gamma_{PE} = [\sin(2^0 z), \cos(2^0 z) \ldots, \sin(2^{L-1} z), \cos(2^{L-1} z)],$$

where L is the number of levels of the encoding.

Using this encoding scheme can allow the neural networks 300 and 350 to represent higher frequency detail.

In some other implementations, the model 140 represents d using sinusoidal positional encoding while representing x using integrated positional encoding.

In particular, the system can use the projected pixel footprint to sample conical frustums along the ray rather than points (as described below). To feed these frustums into the MLP, the model 140 approximates each of them as Gaussian distributions with parameters $\mu_i$, $\Sigma_i$ and replaces the positional encoding $\gamma_{PE}$ with its expectation over the input Gaussian that has parameters $\mu_i$, $\Sigma_i$, i.e., so that the integrated positional encoding of a given frustrum is the expectation of the encoding $\gamma_{PE}$ of a point sampled from the Gaussian distribution with parameters $\mu_i$, $\Sigma_i$. Thus, in these implementations, each point x sampled along the ray (as described below) represents the expectation of sampling from a conical frustrum that has been sampled from the ray.

The model 140 can use the neural networks 300 and 350 to generate a synthesized image given a camera viewpoint as input.

More specifically, each pixel in the synthesized image (i.e., that would be captured by the camera at the new camera viewpoint 126) can be associated with a ray that projects into the scene from an image plane of the camera at the new camera viewpoint 126. The direction and position of a ray corresponding to a pixel in the new image can be computed as a predefined function of the parameters of the camera, e.g., the position and orientation of the camera, the focal length of the camera, and so on, given the camera viewpoint. In some implementations, to account for potential inaccuracies in the parameters of the camera, i.e., the pose of the camera, that are provided to the system. In particular, the system can learn, jointly with the neural networks 300 and 350, pose offset parameters that define a learned pose refinement and then use the pose offset parameters to adjust the provided pose when determining the directions and positions of rays corresponding to pixels. For example, the pose offset parameters can include a position offset and a 3×3 residual rotation matrix.

The ray r(t) for a given pixel can be represented as:

$$r(t) = o + td,$$

where t is a distance along the ray, o is the origin of the ray, e.g., as specified by the new camera viewpoint, and d is the viewing direction corresponding to the pixel.

To generate the color for a given pixel in the image, the model 140 can sample a plurality of points along the ray from the new camera viewpoint and along the viewing direction that corresponds to the pixel. For example, the model 140 can randomly sample distances t along the ray to yield, for each sampled distance t, a sampled point r(t).

For each sampled point, the model 140 can generate a first input that includes data representing the coordinates of the sampled point and process the first input using the first neural network in the view synthesis model to generate an output that includes a volume density for the sampled point and a feature vector. The model 140 can then generate a second input that includes the feature vector and data representing the viewing direction corresponding to the pixel (and, optionally, the target appearance embedding and the target exposure level information) and process the second input using the second neural network in the view synthesis model to generate as output a color for the sampled point.

Thus, the model 140 obtains, for each sampled point, a respective color and a respective volume density.

The model 140 then generates the final color for the pixel using the colors and volume densities for the sampled points. For example, the system can accumulate the colors for the sampled points using weights that are computed based on their corresponding volume densities. As a particular example, the final output color $c_{out}$ for a given pixel when there are N sampled points can be equal:

$$c_{out} = \sum_{i=1}^{N} w_i c_i,$$

where $c_i$ is the color computed for point i, $w_i = T_i(1 - e^{-\Delta_i \sigma_i})$, $T_i = \exp(-\Sigma_{j<i} \Delta_j \sigma_j)$, and $\Delta_i = t_i - t_{i-1}$.

In some implementations, rather than directly using the randomly sampled distances t to generate the final set of points that are used to compute the output color, the model 140 can iteratively resample points by treating the weights $w_i$ as a probability distribution to better concentrate samples in areas of high density.

The system 100 or a different training system trains each model 140, i.e., trains the first neural network 300 and the second neural network 350 on training images that were taken from viewpoints that are in the corresponding sub-region for the model 140. In particular, the training system can train the neural networks to minimize a differentiable rendering loss that measures errors between, for a given viewpoint, a synthesized image of the scene from the given viewpoint generated by the model 140 as described above and a training image of the scene taken from the given viewpoint. One example of such a loss function is described in Jonathan T Barron, Ben Mildenhall, Matthew Tancik, Peter Hedman, Ricardo Martin-Brualla, and Pratul P Srinivasan. Mip-NeRF: A multiscale representation for anti-aliasing neural radiance fields. ICCV, 2021. Another example of such a loss function is described in Ricardo Martin-Brualla, Noha Radwan, Mehdi S M Sajjadi, Jonathan T Barron, Alexey Dosovitskiy, and Daniel Duckworth. Nerf in the wild: Neural radiance fields for unconstrained photo collections. CVPR, 2021.

In some implementations, the model 140 also includes a third neural network 370 that the system 100 uses to compute a visibility estimate for the model 140 for the new camera viewpoint. The visibility estimate estimates a degree to which points along rays cast from the new viewpoint were visible in training images used to train the view synthesis model 140.

More specifically, the third neural network 370 is configured to receive a third input that includes the data representing the coordinates of the point x in the scene and data representing the viewing direction d and to process the third input to output an estimated transmittance of the point from the viewing direction. For example, the third neural network 370 can be an MLP.

Transmittance represents how visible a point is from a particular input camera viewpoint: points in free space or on the surface of the first intersected object to the point, i.e., of the first object intersected by the ray cast from the camera viewpoint to the point, will have transmittance near 1 and points inside or behind the first visible object will have transmittance near 0. If a point is seen from some viewpoints but not others, the regressed transmittance value will be the average over all training cameras and lie between zero and one, indicating that the point is partially observed. To train the third neural network 370, the system can train the neural network 370 to regress transmittance values that match the $T_i$ values computed above from volume densities generated by the first neural network, i.e., by using outputs generated by the first neural network as supervision for the training of the third neural network 370.

To compute the visibility estimate for the model 140 for a given new viewpoint, the system can sample a plurality of point—viewing direction pairs, e.g., that correspond to different pixels in an image that would be generated using the model 140 from the given new viewpoint. For example, the sampled pairs can be all of or a subset of the sampled pairs described above for use in generating the image.

The system can then, for each sampled pair, process a third input that includes data representing coordinates of the point in the pair and data representing the viewing direction in the pair using the third neural network 370 in the view synthesis model 140 to generate an estimated transmittance for the sampled pair and determine the visibility estimate from the estimated transmittances for the plurality of points. For example, the system can compute the visibility estimate as the mean of the estimated transmittances for the plurality of points.

The third neural network 370 can be run independently from the first and second neural networks 350 and 370, so the system can use visibility estimates computed using the third neural network 370 to determine whether to use the corresponding model 140 when generating a new image from a given new camera viewpoint.

Using visibility estimates is described in more detail below with reference to FIG. 4.

Figure 4:
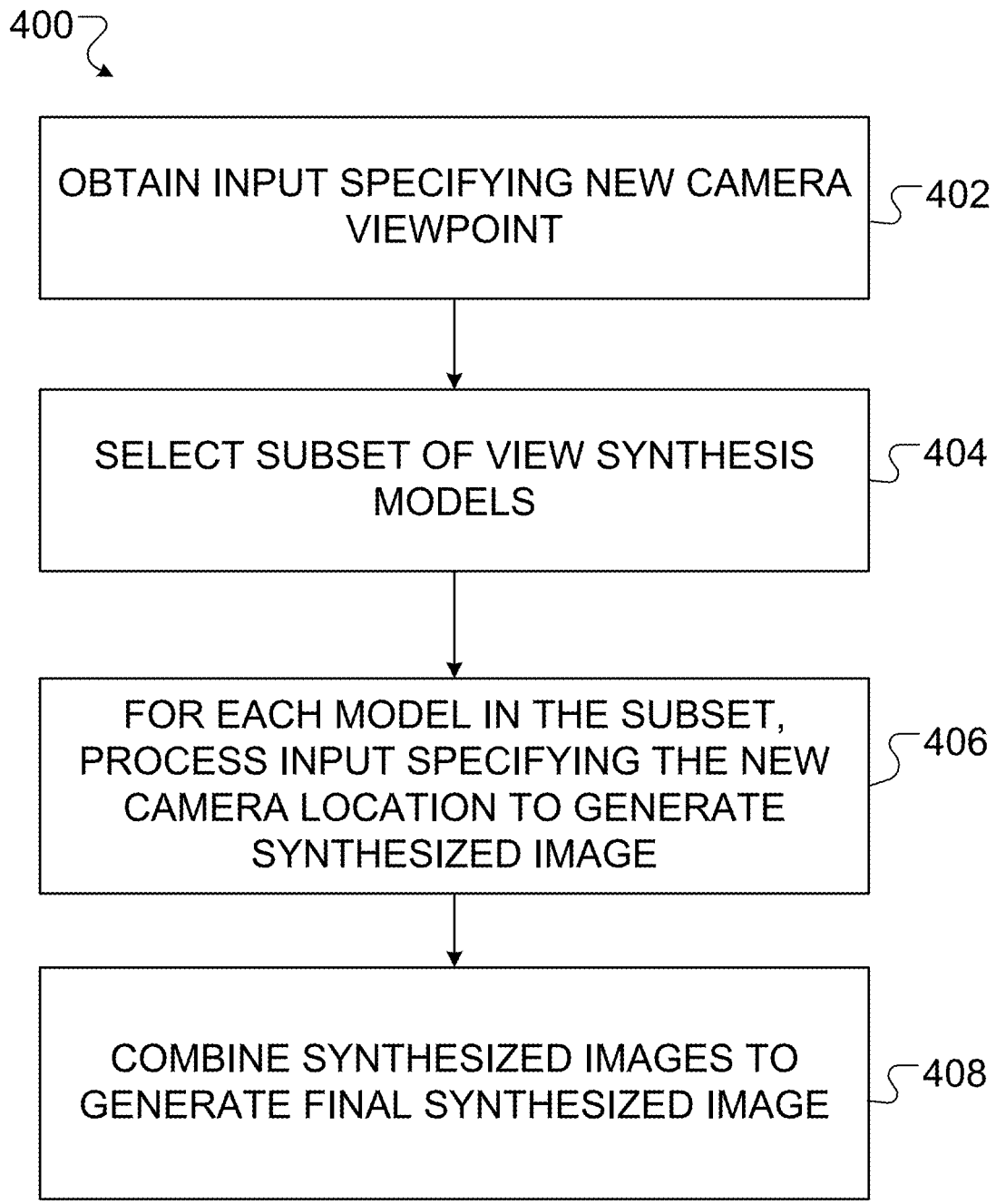
FIG. 4 is a flow diagram of an example process for rendering a new image using an image rendering system.

FIG. 4 is a flow diagram of an example process 400 for rendering a new image. For convenience, the process 400 will be described as being performed by a system of one or more computers located in one or more locations. For example, an image rendering system, e.g., the system 100 in FIG. 1, appropriately programmed in accordance with this specification, can perform the process 400.

As described above, the system maintains a plurality of view synthesis models. Each view synthesis model corresponds to a respective sub-region of a scene of an environment and is configured to receive an input specifying a camera viewpoint in the corresponding sub-region and to generate as output a synthesized image of the scene from the camera viewpoint.

The system obtains an input specifying a new camera viewpoint (step 402).

The system selects, based on the new camera viewpoint, a subset of the plurality of view synthesis models (step 404).

Generally, the system selects, for inclusion in the subset, each view synthesis model that has a corresponding sub-region that includes the new camera viewpoint.

Optionally, the system can then determine whether any of the selected view synthesis models should be removed from the subset.

For example, the system can compute, for each selected model, i.e., for each view synthesis model that has a corresponding sub-region that includes the new camera viewpoint, a respective visibility estimate that estimates a degree to which points along rays cast from the new viewpoint were visible in training images used to train the view synthesis model. One example technique for generating a visibility estimate is described above with reference to FIG. 3.

The system then removes, from the subset, any view synthesis model that has a respective visibility estimate that is below a visibility threshold. Thus, the system refrains from using any view synthesis models that are unlikely to produce meaningful outputs from the new camera viewpoint.

For each view synthesis model in the subset, the system processes a respective input specifying the new camera viewpoint to generate as output a synthesized image of the scene from the new camera viewpoint (step 406).

That is, the system processes respective input specifying the new camera viewpoint using the view synthesis model to generate as output a synthesized image of the scene from the new camera viewpoint.

As described above, in some implementations, each view synthesis model includes a first neural network and a second neural network and uses the first and second neural networks to generate the synthesized image given the respective input for the view synthesis model.

Generating a synthesized image using the first and second neural networks is described above with reference to FIG. 3.

As described above, in some implementations, the second neural networks in each of the models also receive as input target camera exposure information, a target appearance embedding or both. That is, the respective input to each of the models also includes target camera exposure information, a target appearance embedding or both.

When the second neural networks also receive as input target camera exposure information, the system can provide the same target exposure information to each model so that the generated images are consistent with one another. For example, the system can receive the target camera exposure level as input or can randomly select the camera exposure level from a set of possible camera exposure levels. Thus, by adjusting the target camera exposure information, the system can generate images that appear as if they were taken by cameras with different exposure levels.

When the second neural networks also receive as input target appearance embeddings, in some implementations, the system can provide the same target appearance embedding to each model so that the generated images are consistent with one another. For example, the system can receive the target appearance embedding as input or can randomly select the appearance embedding from a set of possible appearance embeddings.

However, these embeddings ("codes") are randomly initialized during training of each view synthesis model and therefore the same code typically leads to different appearances when fed into different view synthesis models. This can be undesirable when compositing images as it may lead to inconsistencies between views.

Thus, in some other implementations, the system receives a target appearance embedding for a first view synthesis model in the subset and generates the respective appearance embeddings for the other view synthesis models in the subset based on the target appearance embedding for the first view synthesis model.

For example, a user can provide a target appearance embedding that matches the appearance embedding from one of the training images used to train the first view synthesis model to cause the system to generate an image that was taken under the same conditions. As another example, a user can provide a target appearance embedding that is a weighted sum of the appearance embeddings from multiple ones of the training images used to train the first view synthesis model to cause the system to generate an image that was taken under conditions that are a combination of the conditions from the multiple training images. As another example, a user can "search" for a target appearance embedding that has qualities of interest to the user by causing the first model to render multiple different images with different appearance embeddings and then selecting the appearance embedding that caused an image with the desired qualities to be generated.

The system then generates the images for each other view synthesis models using the appearance embedding that was generated for that model. Thus, by adjusting the appearance embeddings for the models, the system can generate images that appear as if they were taken at different times of day, with different weather conditions, or under other external conditions that can impact the appearance of a camera image.

To generate the target appearance embedding for a given model, the system first selects a 3D matching location between the given model and an adjacent model for which the appearance embedding has already been generated. For example, the system can select a matching location that has a visibility prediction that exceeds a threshold value for both models.

Given the matching location, the system freezes the model weights and only optimizes the appearance embedding of the given model in order to reduce the $l_2$ loss between the respective area renders in the matching location. Because the model weights are frozen, the system can perform this optimization quickly and in a computationally efficient manner, e.g., requiring fewer than 100 iterations to converge. The system then uses the optimized appearance embedding as the target appearance embedding for the given model. This procedure aligns most global and low-frequency attributes of the scene, such as time of day, color balance, and weather, between the two models, allowing for successful compositing of images generated from the two models.

The optimized appearance is iteratively propagated through the scene starting from the first view synthesis model (the "root" model). If multiple models surrounding a given model have already been optimized, the system considers each of them when computing the loss, i.e., by including a respective $l_2$ loss for each of the multiple models in the optimization.

The system combines the synthesized images generated by the view synthesis models in the subset to generate a final synthesized image of the scene from the new camera viewpoint (step 408).

For example, the system can determine a respective weight for each view synthesis model in the subset and then generating the final synthesized image by interpolating between the synthesized images generated by the view synthesis models in the subset in accordance with the respective weights for the view synthesis models in the subset. That is, the system interpolates between, for each pixel, the color outputs for the pixel in the synthesized images in accordance with the respective weights for the corresponding view synthesis model.

As one example, the system can determine the respective weight for each model based on a distance between the new camera viewpoint and a center ("origin") of the corresponding sub-region of the scene. As a particular example, the system can compute the weight $w_i$ for the i-th model as $w_i \propto \text{distance}(c, x_i)^{-p}$, where c is the new camera viewpoint location, $x_i$ is the location of the center of the corresponding sub-region for the i-th model, and p is a constant value that influences the rate of blending between images.

In some implementations, the system only performs the above process 400 when the viewpoint is located in a region of the environment that is included in the corresponding sub-regions for multiple ones of the view synthesis models. That is, when the viewpoint is located in a region of the environment that only has a single corresponding model, the system uses the single view synthesis model to generate the synthesized image, e.g., without checking visibility and without combining output images as described above.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   maintaining a plurality of view synthesis models, wherein each view synthesis model is configured to receive an input specifying a camera viewpoint and to generate as output a synthesized image of a scene from the camera viewpoint;
   obtaining an input specifying a new camera viewpoint;
   selecting, based on the new camera viewpoint, a subset of the plurality of view synthesis models;
   for each view synthesis model in the subset, processing a respective input specifying the new camera viewpoint to generate as output a synthesized image of the scene from the new camera viewpoint; and
   combining the synthesized images generated by the view synthesis models in the subset to generate a final synthesized image of the scene from the new camera viewpoint, wherein the combining comprises:
   determining a respective weight for each view synthesis model in the subset; and
   generating the final synthesized image by interpolating between the synthesized images generated by the view synthesis models in the subset in accordance with the respective weights for the view synthesis models in the subset.

2. The method of claim 1, wherein each view synthesis model has been trained on a respective set of training data that includes images captured from viewpoints within a corresponding sub-region of the scene.

3. The method of claim 2, wherein the view synthesis models have been trained independently on the respective sets of training data.

4. The method of claim 1, wherein selecting, based on the new camera viewpoint, a subset of the plurality of view synthesis models comprises:
   selecting, for inclusion in the subset, each view synthesis model that corresponds to a respective sub-region of the scene that includes the new camera viewpoint.

5. The method of claim 4, further comprising:
   determining, for each view synthesis model that corresponds to a respective sub-region of the scene that includes the new camera viewpoint, a respective visibility estimate that estimates a degree to which points along rays cast from the new viewpoint were visible in training images used to train the view synthesis model; and
   removing, from the subset, any view synthesis model that has a respective visibility estimate that is below a visibility threshold.

6. The method of claim 4, wherein determining the respective weight for each view synthesis model in the subset comprises, for each view synthesis model:
   determining the respective weight based on a distance between the new camera viewpoint and a center of the corresponding sub-region of the scene.

7. The method of claim 5, wherein each view synthesis model comprises:
   a first neural network that is configured to receive a first input comprising data representing coordinates of a point in the scene and process the first input to generate an output comprising a volume density for the point and a feature vector; and
   a second neural network that is configured to receive a second input comprising the feature vector and data representing a viewing direction and process the second input to generate as output a color.

8. The method of claim 7, wherein processing a respective input specifying the new camera viewpoint to generate as output a synthesized image of the scene from the new camera viewpoint comprises, for each pixel in the image:
   sampling a plurality of points along a ray from the new camera viewpoint and along a viewing direction that corresponds to the pixel;
   for each sampled point:
     generating a first input comprising data representing coordinates of the sampled point;
     processing the first input using the first neural network in the view synthesis model to generate an output comprising a volume density for the sampled point and a feature vector;
     generating a second input comprising the feature vector and data representing the viewing direction corresponding to the pixel; and processing the second input using the second neural network in the view synthesis model to generate as output a color for the sampled point; and generating a color for the pixel using the colors and volume densities for the sampled points.

9. The method of claim 8, wherein, for each view synthesis model, the second input comprises a respective appearance embedding characterizing a target appearance of the synthesized image.

10. The method of claim 9, further comprising:
receiving a target appearance embedding for a first view synthesis model in the subset; and
generating the respective appearance embeddings for the other view synthesis models in the subset based on the target appearance embedding for the first view synthesis model.

11. The method of claim 9, further comprising:
receiving a target appearance embedding; and
setting the respective appearance embeddings for the view synthesis models in the subset to the target appearance embedding.

12. The method of claim 8 wherein for each view synthesis model, the second input comprises data representing target camera exposure information for the synthesized image.

13. The method of claim 7, wherein each view synthesis model comprises a third neural network that is configured to receive a third input comprising data representing coordinates of the point in the scene and data representing the viewing direction and to process the third input to output an estimated transmittance of the point from the viewing direction, and wherein determining, for each view synthesis model that corresponds to a respective sub-region of the scene that includes the new viewpoint, a respective visibility estimate comprises:
for each of a plurality of point—viewing direction pairs, processing a third input comprising data representing coordinates of the point in the pair and data representing the viewing direction in the pair using the third neural network in the view synthesis model to generate an estimated transmittance; and
determining the visibility estimate from the estimated transmittances for the plurality of points.

14. The method of claim 13, wherein the visibility estimate is a mean of the estimated transmittances.

15. One or more non-transitory computer-readable storage media storing instructions that when executed by one or more computers cause the one more computers to perform operations comprising:
maintaining a plurality of view synthesis models, wherein each view synthesis model is configured to receive an input specifying a camera viewpoint and to generate as output a synthesized image of the scene from the camera viewpoint;
obtaining an input specifying a new camera viewpoint;
selecting, based on the new camera viewpoint, a subset of the plurality of view synthesis models;
for each view synthesis model in the subset, processing a respective input specifying the new camera viewpoint to generate as output a synthesized image of the scene from the new camera viewpoint; and
combining the synthesized images generated by the view synthesis models in the subset to generate a final synthesized image of the scene from the new camera viewpoint, wherein the combining comprises:
determining a respective weight for each view synthesis model in the subset; and
generating the final synthesized image by interpolating between the synthesized images generated by the view synthesis models in the subset in accordance with the respective weights for the view synthesis models in the subset.

16. A system comprising one or more computers and one or more storage devices storing instructions that when executed by the one or more computers cause the one more computers to perform operations comprising:
maintaining a plurality of view synthesis models, wherein each view synthesis model is configured to receive an input specifying a camera viewpoint in the corresponding sub region and to generate as output a synthesized image of the scene from the camera viewpoint;
obtaining an input specifying a new camera viewpoint;
selecting, based on the new camera viewpoint, a subset of the plurality of view synthesis models;
for each view synthesis model in the subset, processing a respective input specifying the new camera viewpoint to generate as output a synthesized image of the scene from the new camera viewpoint; and
combining the synthesized images generated by the view synthesis models in the subset to generate a final synthesized image of the scene from the new camera viewpoint, wherein the combining comprises:
determining a respective weight for each view synthesis model in the subset; and
generating the final synthesized image by interpolating between the synthesized images generated by the view synthesis models in the subset in accordance with the respective weights for the view synthesis models in the subset.

17. The system of claim 16, wherein each view synthesis model has been trained on a respective set of training data that includes images captured from viewpoints within a corresponding sub-region of the scene.

18. The system of claim 17, wherein the view synthesis models have been trained independently on the respective sets of training data.

19. The system of claim 16, wherein selecting, based on the new camera viewpoint, a subset of the plurality of view synthesis models comprises:
selecting, for inclusion in the subset, each view synthesis model that corresponds to a respective sub-region of the scene that includes the new camera viewpoint.

20. The system of claim 16, wherein the operations further comprise:
determining, for each view synthesis model that corresponds to a respective sub-region of the scene that includes the new camera viewpoint, a respective visibility estimate that estimates a degree to which points along rays cast from the new viewpoint were visible in training images used to train the view synthesis model; and
removing, from the subset, any view synthesis model that has a respective visibility estimate that is below a visibility threshold.

* * * * *